(12) United States Patent
Chevallier et al.

(10) Patent No.: US 7,546,242 B2
(45) Date of Patent: Jun. 9, 2009

(54) METHOD FOR REPRODUCING AUDIO DOCUMENTS WITH THE AID OF AN INTERFACE COMPRISING DOCUMENT GROUPS AND ASSOCIATED REPRODUCING DEVICE

(75) Inventors: Louis Chevallier, La Meziere (FR); Izabela Grasland, Breteil (FR); Jean-Ronan Vigouroux, Rennes (FR); Jean-Baptiste Henry, Melesse (FR)

(73) Assignee: Thomson Licensing, Boulogne Billancourt (FR)

( * ) Notice: Subject to any disclaimer, the term of this patent is extended or adjusted under 35 U.S.C. 154(b) by 0 days.

(21) Appl. No.: 10/567,272

(22) PCT Filed: Aug. 5, 2004

(86) PCT No.: PCT/FR2004/050374

§ 371 (c)(1),
(2), (4) Date: Feb. 6, 2006

(87) PCT Pub. No.: WO2005/017892

PCT Pub. Date: Feb. 24, 2005

(65) Prior Publication Data

US 2006/0200769 A1    Sep. 7, 2006

(30) Foreign Application Priority Data

Aug. 7, 2003    (FR) ................................ 03 09715
Aug. 7, 2003    (FR) ................................ 03 09716

(51) Int. Cl.
*G10L 21/06* (2006.01)

(52) U.S. Cl. .................. 704/270; 704/245; 704/278; 707/104.1

(58) Field of Classification Search ............... 704/245, 704/270, 272, 278; 707/104.1
See application file for complete search history.

(56) References Cited

U.S. PATENT DOCUMENTS 5,924,068 A * 7/1999 Richard et al. ............. 704/260

(Continued)

FOREIGN PATENT DOCUMENTS

EP    1227392    7/2002

(Continued)

OTHER PUBLICATIONS

Patent Abstracts of Japan, vol. 1995, No. 5, Jun. 30, 1995 and JP 7-044575 (See Ref. AB).

(Continued)

*Primary Examiner*—Martin Lerner
(74) *Attorney, Agent, or Firm*—Robert D. Shedd; Paul P. Kiel (57) ABSTRACT

A method of reproduction by a reproduction apparatus for reproducing audio documents forming part of a set of documents. The method includes a prior step of partitioning of the documents of the set into groups of documents whose audio parameters exhibit a similitude, making it possible to determine at least one document representing each group by taking into account its audio parameters. Then, an identifier of a document representing the group is reproduced graphically and/or in a sound manner. In this way, the user can take note of the type of music involved and can select this group by virtue of the graphical identifier. A command may be activated making it possible to go from one group to another; a group may be selected and reproduce the documents of this group. The invention also relates to a reproduction apparatus furnished with a user interface allowing reproduction.

23 Claims, 7 Drawing Sheets

U.S. PATENT DOCUMENTS

| | | | |
|---|---|---|---|
| 6,728,752 B1* | 4/2004 | Chen et al. | 709/203 |
| 6,772,124 B2* | 8/2004 | Hoffberg et al. | 704/270.1 |
| 7,190,794 B2* | 3/2007 | Hinde | 381/17 |
| 7,392,532 B2* | 6/2008 | White et al. | 725/135 |
| 7,395,547 B2* | 7/2008 | Hammett et al. | 725/34 |
| 7,420,482 B2* | 9/2008 | Henry et al. | 341/51 |
| 2001/0049826 A1* | 12/2001 | Wilf | 725/120 |
| 2002/0180803 A1* | 12/2002 | Kaplan et al. | 345/810 |
| 2003/0050784 A1* | 3/2003 | Hoffberg et al. | 704/270.1 |
| 2003/0205124 A1* | 11/2003 | Foote et al. | 84/608 |
| 2003/0206204 A1* | 11/2003 | Hiron et al. | 345/853 |
| 2003/0225791 A1* | 12/2003 | Stauder et al. | 707/104.1 |
| 2004/0139064 A1* | 7/2004 | Chevallier et al. | 707/3 |
| 2004/0158860 A1* | 8/2004 | Crow | 725/46 |
| 2006/0007479 A1* | 1/2006 | Henry et al. | 358/1.15 |
| 2006/0202994 A1* | 9/2006 | Chevallier et al. | 345/440 |
| 2007/0271224 A1* | 11/2007 | Essafi et al. | 707/3 |

FOREIGN PATENT DOCUMENTS

| | | |
|---|---|---|
| JP | 7-044575 | 1/1995 |

OTHER PUBLICATIONS

Search Report Dated Jan. 26, 2005.

Feiten, Bernhard, et al., "Automatic Indexing of a Sound Database Using Self-organiziang Neural Nets", Computer Music Journal, 18:3, 1994, pp. 53-65.

Makhoul, John, et al., "Speech and Language Technologies for Audio Indexing and Retrieval", Proceedings Of The IEEE, vol. 88, No. 8, Aug. 2000, pp. 1338-1353.

Scheirer, Eric D., "Music-Listening Systems", Massachusetts Institute of Technology, Copyright 2000, 222 pgs.

* cited by examiner

Fig. 1

Values of low-level parameters of the sound documents

| Title of the document | Tempo | Energy | Zero crossing rate | Brightness | Envelope | Bandwidth |
|---|---|---|---|---|---|---|
| Joy to the World | 51143 1.86147 | 1.18507 E+8 | 34925 | 3,57 −759.773 | 3464.9 4637.7 | 5666 57743.9 |
| Maggie May – Rod Stewart | 22546 2.2132 | 2.45232 E+8 | 15421 | 4,23 −852,2 | 5226 4512.2 | 6233 51283.9 |
| It's too late – Caroline | 44592 1.5623 | 1.1206 E+8 | 34509 | 5,02 −785.773 | 4699.2 5022.8 | 5526 32593.9 |
| Indian Reservation | 34512 1.9445 | 1.84215 E+8 | 39444 | 4,57 −612.1 | 5690 4220.8 | 51254 55263.8 |
| Go Away little girl – Franck Sinatra | 50122 1.9045 | 1.2451 E+8 | 24567 | 4,56 −899.01 | 5692.1 5523.2 | 5256 57998.7 |
| The Partisan Leonard Cohen | 49223 2.1405 | 1.407 E+8 | 28102 | 6,23 −611.744 | 3884.9 4567.7 | 5687 51543.5 |
| Daddy Cool – Boney M | 48599 1.8956 | 1.1054 E+8 | 31022 | 6,01 −562.02 | 3169.2 4199.7 | 5126 57225.0 |
| Just my Imagination | 21559 1.9985 | 1.72945 E+8 | 37405 | 4,58 −566.23 | 3464.9 3652.7 | 5654 57743.6 |
| You've got a friend | 44560 1.8944 | 1.4098 E+8 | 39552 | 3,95 −523.012 | 5264 4415.7 | 5989 55513.8 |
| Brown Sugar – Rolling stones | 53555 2.2600 | 1.2448 | 38626 | 4,98 −528.888 | 3844.5 3926.7 | 5777 52153.2 |

METHOD FOR REPRODUCING AUDIO DOCUMENTS WITH THE AID OF AN INTERFACE COMPRISING DOCUMENT GROUPS AND ASSOCIATED REPRODUCING DEVICE

This application claims the benefit, under 35 U.S.C. § 365 of International Application PCT/FR04/050374, filed Aug. 5, 2004, which was published in accordance with PCT Article 21(2) on Feb. 24, 2005 in French and which claims the benefit of French patent application No. 0309715, filed Aug. 7, 2003 and French patent application No. 0309716, filed Aug. 7, 2003.

The invention relates to a method of reproducing audio documents on the basis of a reproduction apparatus, and a reproduction apparatus furnished with a graphical user interface allowing selection.

The storage of a large number of sound documents within mass-market equipment is known. The reproduction apparatus is fitted with an interface making it possible to easily retrieve the document desired by the user. The reproduction apparatuses are for example, personal audio CD players, personal players containing a hard disk (such as the MP3 Lyra model marketed by the applicant) capable of storing 300 hours of music, players for the home with display and remote control, personal computers with screen, hard disk, CD player and keyboard. In all cases, the user must introduce the specific identifier of the audio document to be reproduced. In the case of audio CDs, he must program the number of the CD and the number of the piece within this CD. In certain cases, the reproduction apparatus is fitted with a player which displays the identifier of the audio document currently being reproduced. For example, the Lyra MP3 player has a small LCD screen making it possible to display the functions selected in the form of icons, and the numbers of the audio pieces. Home equipment has a hard disk of large capacity, 20 Gigabytes for example, thereby making it possible to store thousands of sound contents. The graphical interface consists of a large screen making it possible to display more information, the complete title of the piece for example.

According to the type of interface, the selection of the sound documents is performed through a number or through an identifier within a list displayed on a screen. With the growth in storage means, the number of documents to be stored is more significant and therefore, the user may spend some time searching for the one in which he is interested. When information in digital form is associated with the sound documents—referred to as attributes—the reproduction apparatus can create groups. The attributes of the audio documents are for example the genre (classical music, pop, choral, jazz, etc.), the title, the producer, the singer, the publisher, etc.

By determining groups possessing a degree of musical unity and by displaying these groups with the aid of an identifier, the user can firstly select a group then navigate within it to search for a piece. The identifier of the group is then the common attribute shared by the documents.

However, certain audio contents accessible to a user do not automatically possess these attributes, for example when the user records his musical pieces live himself.

In this case, another way of classing audio documents is to analyse the sound signals directly. Signal analysis techniques exist which make it possible to calculate values of so-called "low-level" parameters for each audio content. These parameters are for example: the tempo, the energy, the brightness, the envelope, etc. They are determined by analysing the signal either in its digital form, or in its analogue form. A technique of audio content indexation is explained in the article "Speech and Language Technologies for audio indexing and retrieval" published in August 2000 in the IEEE Journal page 1338 to 1353 of Volume 88. The article explains how by analysing the audio signal it is possible to classify the various contents. Other articles describe means of calculating low-level parameters and possible uses, here are some other articles included by reference to the present patent application:

B. Feiten and S. Gunzel, Automatic indexing of a Sound Database using self-organizing neural networks, Computer Music Journal, 18 (3°, 1994

Eric Scheirer, Music Listening systems, PhD thesis, MIT Media Laboratory, April 2000.

Once the low-level parameters have been determined for each sound document of the collection, the storage or reproduction apparatus can class them groupwise as a function of these parameters. Thus, the classical music contents may constitute one group, likewise the jazz pieces another group. Patent application PCT/GB01/00681 published on 23 Aug. 2001 describes a user interface consisting of a graphic displayed on a screen and controlled by an audiovisual receiver. The menu displayed exhibits icons ("classical", "jazz", "chart music", "talk back", etc.) selectable by the user, the selection of a document of the group activating the reproduction of its sound content. The identifiers of the groups may be introduced by the user as a function of the documents contained in the group at a given instant. But when new documents are downloaded, the identification of the groups must be able to evolve so as to define the group better. Moreover, if many documents are assigned to a group, it may be beneficial to split it into several groups to obtain sets of documents of average size. Such an operation compels the user to redefine the identifiers.

Japanese patent JP07-044575 discloses a method of vocal recognition making it possible to process vocal documents or vocal sources and to place them in a video. The vocal contents are represented in a space ("sound field space") by symbols that can be selected with the aid of a mouse. The user moves within the "sound field space" with the aid of the mouse. The documents are grouped according to a hierarchical structure. When navigating in the sound space, the volume of a sound of a document is inversely proportional to the distance between the user placed in the space and this document. Therefore, all the sounds associated with the documents of a group are emitted, this superposition of sound does not facilitate navigation and selection within this sound space.

One of the objects of the present invention aims to offer the user an automatic means of classing the documents into groups and identifying them easily for the user. Then in an effective and convenient manner, the user navigates from group to group, as well as within a group.

The subject of the invention is a method of reproduction within an audio document reproduction apparatus characterized in that it comprises the following steps:

partitioning of the documents into groups of documents possessing at least one similar audio characteristic, determination of at least one audio document representing each group, positioning of a plurality of audio documents in a space, the positioning of an audio document being dependent on at least one characteristic of the document, the user occupying a position in the said space, reproduction of at least one identifier of a document representing a group, the reproduced identifier or identifiers having a position situated at a distance less than a determined distance with respect to the position of the user in the space.

In this way, the apparatus itself determines the groups of audio documents and at least one document representative of the group, an identifier of the representative document or documents being emphasized in a graphical and/or auditory manner for the user. In this way, the user can take note of the type of music involved and can select this group and elements of this group so as to reproduce them. According to a first improvement, the user can activate a command making it possible to go from one group to another, the identifiers as well as the documents reproduced are automatically updated as a function of the current document group. According to another improvement, the user can by activating a command reproduce the documents within the group whose identifier is reproduced.

According to another improvement, the method comprises a step of representation of the documents in a space whose number of dimensions is equal to the number of audio parameters, and whose documents are associated with points disposed within this space. In this way, the determination of a document of the group as representative of this group depends on the distance between the equibarycentre of the points associated with the documents of the group and the point associated with this document. The document whose associated point is closest to the equibarycentre is regarded as representative of the group.

According to another improvement, the method comprises a step of projection onto a space of determined dimension of the points associated with the documents of the set and possessing as coordinates the audio parameters. In this way, the set of documents can be shown by representing the projection space graphically. Moreover, the calculations of distance between the equibarycentre and each point associated with a document of a group are simpler to calculate. According to a variant, the points of the representative documents of a group are situated at a distance from the equibarycentre lying in a determined interval. In this way, a single document does not characterize the group but several, which surrounding the equibarycentre enable the user to take better note of the genre of the group while appreciating the diversity thereof.

According to another improvement, when the user has selected a group and when he reproduces the documents of this group, the order of reproduction of the documents consists in commencing with that whose point is the closest to the barycentre, and thereafter in taking those situated further and further away.

According to another improvement, a document regarded as representative of a group possesses low-level parameters whose values are close to the average of the values of the documents of the group.

According to another improvement, if several documents are representatives of a group, the reproduction of each of the documents is performed sequentially during a determined period.

According to another improvement, the reproduction apparatus receives the values of the audio parameters. On the basis of these values, the apparatus determines the groups and the documents representing these groups.

The subject of the invention is also an audio documents reproduction apparatus comprising a means of command introduction; characterized in that it comprises furthermore a means of calculation for partitioning documents into groups of documents possessing at least one similar audio characteristic, a means of determination of at least one document representing each group, a means of calculation of positioning data associated with each document in a space, the data being determined by at least one characteristic specific to the document, a positioning datum also being assigned to the position of the user within the space, a means of selection of at least one document representing a group, the selected document or documents having a position situated at a distance less than a determined distance with respect to the position of the user in the space, a means of reproduction of at least one identifier of at least one document representing a group.

Other characteristics and advantages of the invention will now become apparent with greater detail within the framework of the description which follows of exemplary embodiments given by way of illustration and referring to the appended figures which represent.

Figure 1:
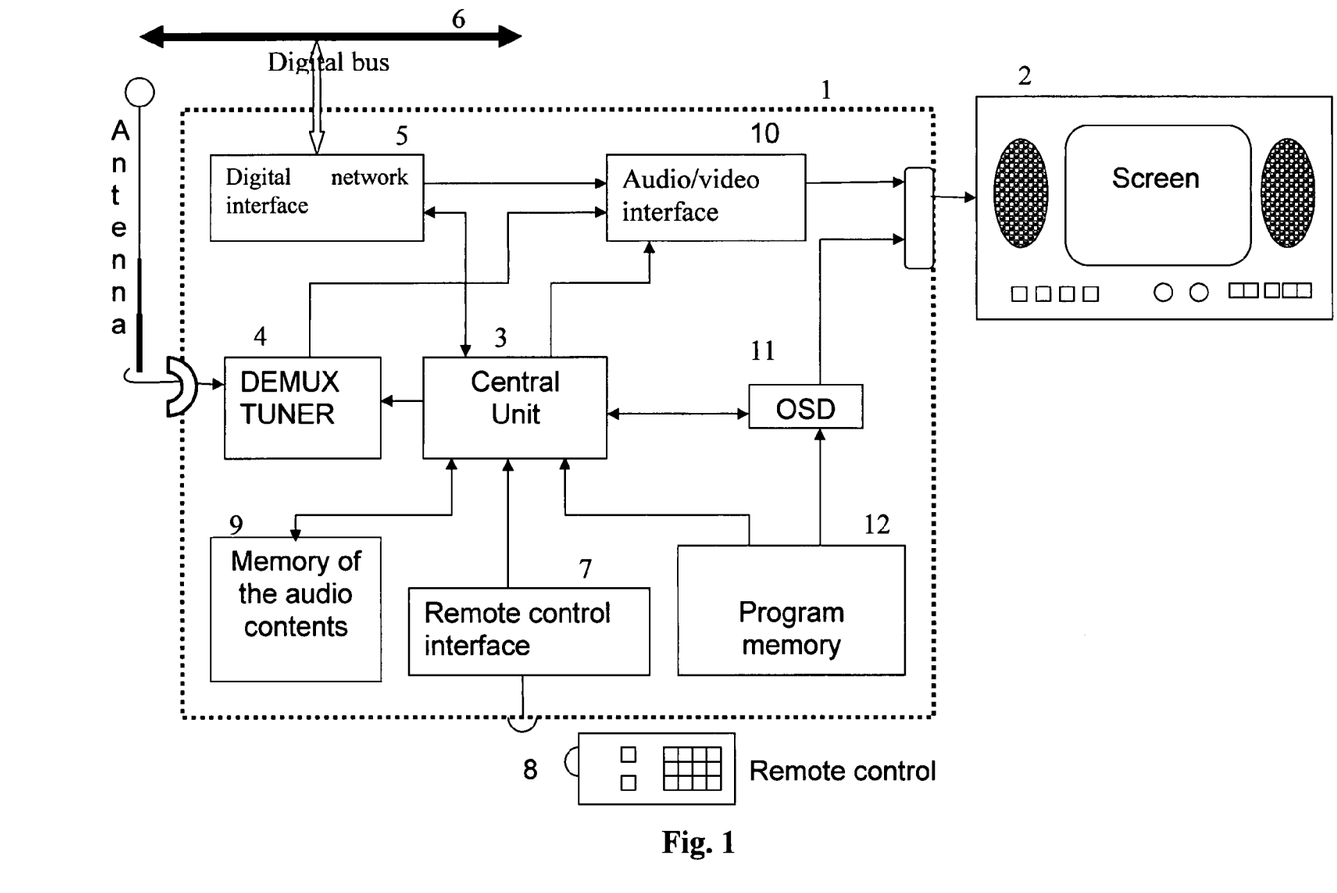
FIG. 1 is a block diagram of an exemplary sound document reproduction apparatus for the implementation of the invention.

We shall firstly describe the manner of operation of a multimedia receiver 1 associated with a device for display and reproduction of sound 2. The receiver comprises a central unit 3 linked to a program memory 12, and an interface 5 for communication with a high bit rate local digital bus 6 making it possible to receive audio and/or video data at high bit rate. This network is for example an IEEE 1394 network. The receiver can also receive audio and/or video data from a transmission network through a reception antenna associated with a demodulator 4, this network can be of radio or television type. The receiver furthermore comprises a receiver of infrared signals 7 for receiving the signals from a remote control 8, a memory 9 for storing a database, and audio/video decoding logic 10 for generating the audiovisual signals dispatched to the television screen 2. The remote control 8 is fitted with direction keys ↑, ↓, → and ← and "OK", "Group", "sound documents" and "Select" keys whose function we shall see later.

The receiver also comprises a circuit 11 for displaying data on the screen, often called an OSD circuit, standing for "On Screen Display". The OSD circuit 11 is a text and graphic generator which makes it possible to display menus, pictograms or other graphics on the screen, and menus presenting the navigation. The OSD circuit is controlled by the Central Unit 3 and a navigator 12. The navigator 12 is advantageously embodied in the form of a program module recorded in a read only memory. It may also be embodied in the form of a specialized circuit of ASIC type for example.

The digital bus 6 and/or the transmission network transmit audio contents to the receiver either in digital form, or in analogue form, the receiver recording them in a memory 9. According to a preferred embodiment, the audio contents are received in digital form, preferably coded according to a compression standard, MP3 for example, and stored in the same form. According to this preferred embodiment, the memory 9 is a large-capacity hard disk, 40 gigabytes for example. The storage of a minute of audio content in MP3 occupying around 1 megabyte, such a disk is capable of recording 666 sound hours of document. The downloading of audio content is a well known technique which need not be explained in the present patent application.

Once a certain number of audio contents have been stored in the memory, the user wants to reproduce them and to do so without too many manual interventions, he also wants the contents to follow one another with a similitude so as to maintain a harmonious ambiance. To do this, a software module of the navigator analyses each audio content during its reception and extracts the low-level parameters therefrom. As we indicated at the beginning of the description, numerous signal analysis techniques exist which make it possible to obtain arrays of digital descriptors for these songs. The number of elements of a descriptor is of the order of a few tens.

Figure 2:
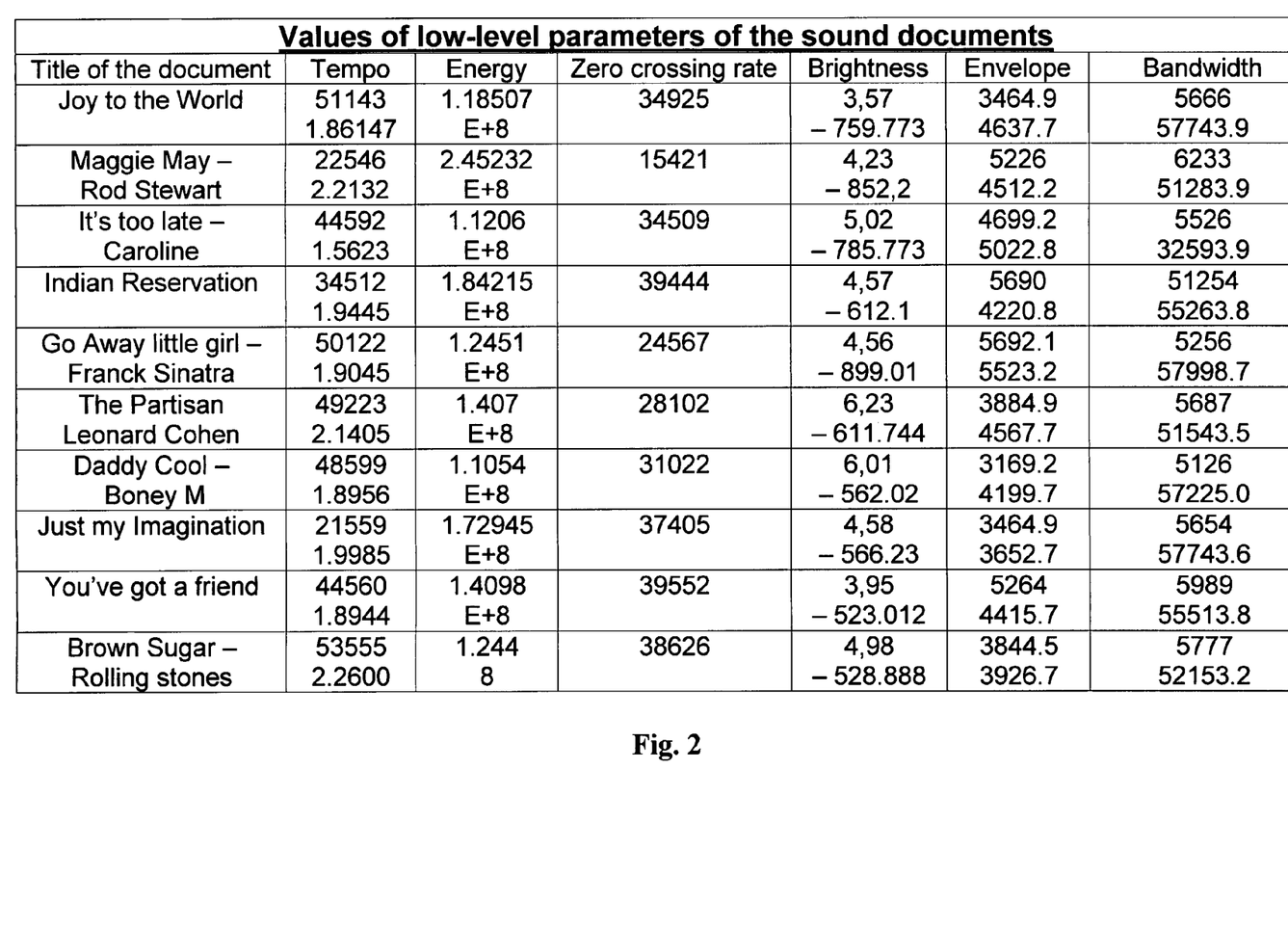
FIG. 2 is an array associating for each document of the collection its values of low-level parameters.

The array contained in the screen page of FIG. 2 presents the values of low-level parameters constituting the descriptors of a certain number of audio documents. The first column of the array presents the title of the audio content, each content is numbered. The subsequent columns present the values of low-level parameters associated with the document, such as the mean sound intensity, the tempo, the energy, the zero crossing rate, the brightness, the envelope, the bandwidth, the loudness, the cepstral coefficients, etc.

According to an improvement, the low-level parameters may be provided in digital form together with the audio content. When the content is provided by a means of digital transmission and in compressed form, the associated low-level parameters constituting a field attached to the audio content. This solution is particularly advantageous since the calculation of the parameters is performed by the producer or the provider of the content and not by the user, and hence it is carried out once only.

Be they downloaded or calculated locally, the descriptors are stored in the memory 9 and then utilized to create groups of documents possessing certain similitudes. According to a first approach, the grouping of the contents into coherent groups (or clusters) may be carried out with the aid of a so-called "clustering" algorithm, for example the k-means algorithm (Mac Queen, "Some Methods for classification and analysis of multivariate observations", Proc Fifth Berkeley Symposium on Math., Stat. and Prob., vol 1, pp 281-296, 1967.) The array of descriptors of FIG. 2 possesses a new column defining the group in which the content is situated. Group calculation techniques are well known, using the k-means algorithm the number of groups thus produced can easily be controlled.

According to a second approach, the groups are determined by a prior choice of classes (for example: mood, dominant instruments, tempo, etc.) and a ground truth helping to define these classes.

Once the documents have been classed within the various groups, the program will then determine one or more representative documents, or representatives of the said group.

One way of proceeding consists in positioning identifier points Pi identifying each document of a group in a multidimensional space and in calculating the document situated nearest the equibarycentre of the set of these points. The equibarycentre is the centre of gravity of a set of points possessing the same mass. The positions of the points associated with each document are obtained on the basis of the low-level parameters, the space containing these points possesses as many dimensions as the document possesses low-level parameters.

Figure 3:
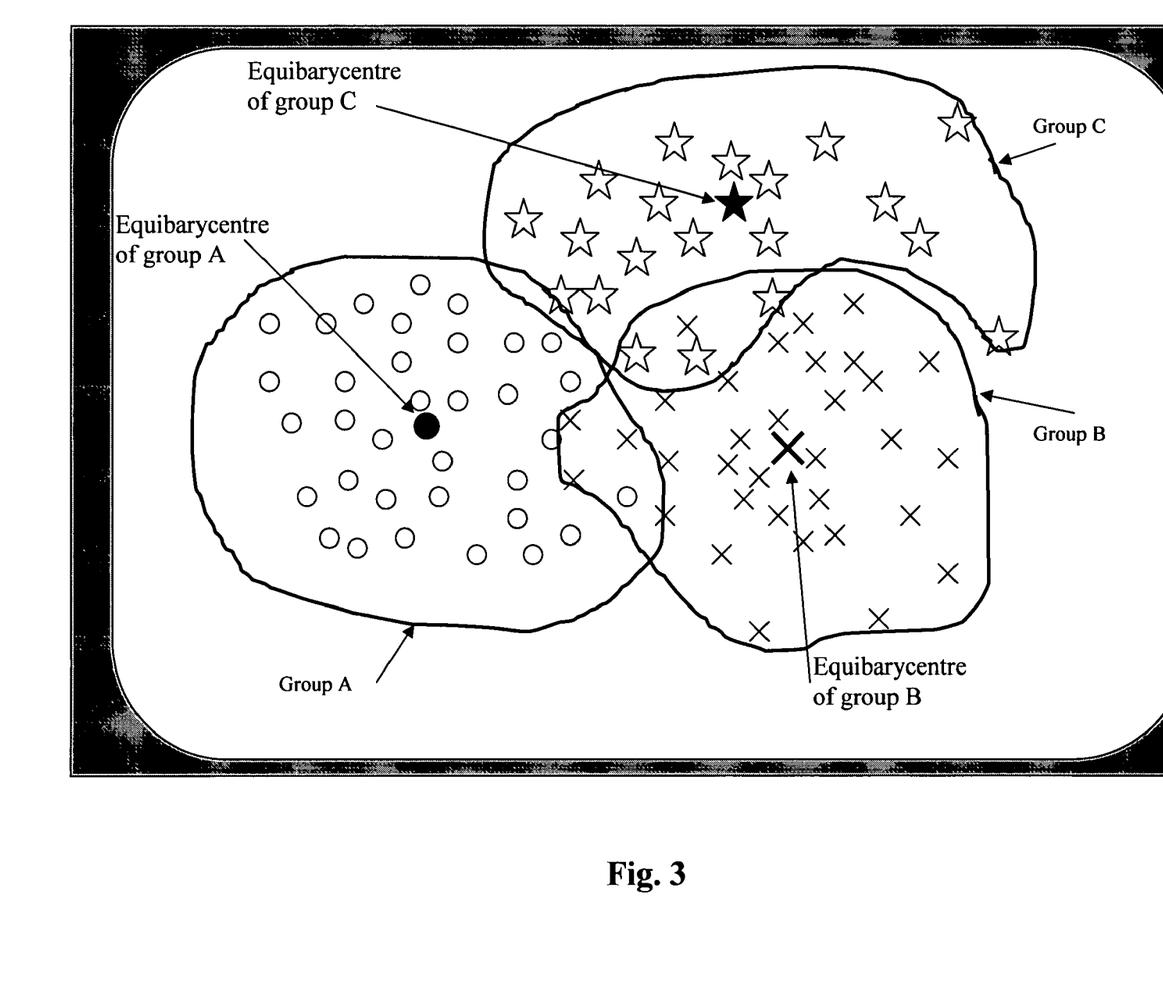
FIG. 3 represents a projection onto a two-dimensional space of the points associated with documents belonging to three groups, FIG. 4 describes a screen shot presenting a screen background and an interface for selecting the various groups of sound documents.

A projection onto a two-dimensional space can be used to clearly explain the principle. FIG. 3 represents a two-dimensional space where the points corresponding to three groups of documents, denoted A B and C, are disposed. The coordinates (xi, yi) of each point are obtained by projecting the point Pi onto a space of dimension 2. The projection is determined by principal component analysis or PCA. PCA is described in particular in the Saporta document 1990, entitled "Probabilités Analyse de données et statistiques, Edition Technip." [Probabilities data analysis and statistics, published by Technip]. This well-known data analysis algorithm seeks to discover a subsystem of axes that is linearly tied to the original which best "spreads" the samples, these axes tend to merge the correlated original axes. The low-level descriptors being assumed to have perceptible coherence (close sounds can be perceived if and only if the values of the low-level descriptors are close), and the projection being continuous, the sound documents associated with close points within the space of dimension 2, resemble one another from the auditory standpoint. The same example can be applied to a space of dimension 3, using a projection in such a space.

The calculation of the equibarycentre applied to the three sets leads to the determination of three points GA, GB and GC, which are situated approximately at the centre of each contour delimiting the groups A, B, and C such as shown in FIG. 3. According to the present exemplary embodiment, the document whose point (xi, yi) is closest to the equibarycentre of a group is regarded as the representative of the group.

The step consisting in projecting the points onto a one-, two- or three-dimensional space makes it possible to create a graphical representation of the collection of documents accessible from an apparatus. Moreover, the calculations of distance between the equibarycentre and each point associated with a document of a group is simpler, since the number of dimensions of the projection space is markedly less than the number of low-level parameters. Depending on the membership of this or that group, the point associated with the document is of a certain shape (as shown in FIG. 3), or of a certain colour, or any other distinctive graphical characteristic. A graphical representation such as this constitutes together with a keypad a user interface making it possible to select any point whatsoever within a group. To do this, the user can jump from one point to another by indicating a direction of navigation with the aid of the direction keys.

However, the step of projection onto a one-, two- or three-dimensional space is optional, since it is perfectly possible to determine the equibarycentre of a group of points disposed in a multidimensional space, likewise it is possible to calculate the distances separating any point whatsoever of the group with the equibarycentre. In this case, it is difficult to represent the documents by points, the graphical interface then presents only graphical identifiers of groups. Such an example of a graphical interface is represented in FIG. 4.

Figure 4:
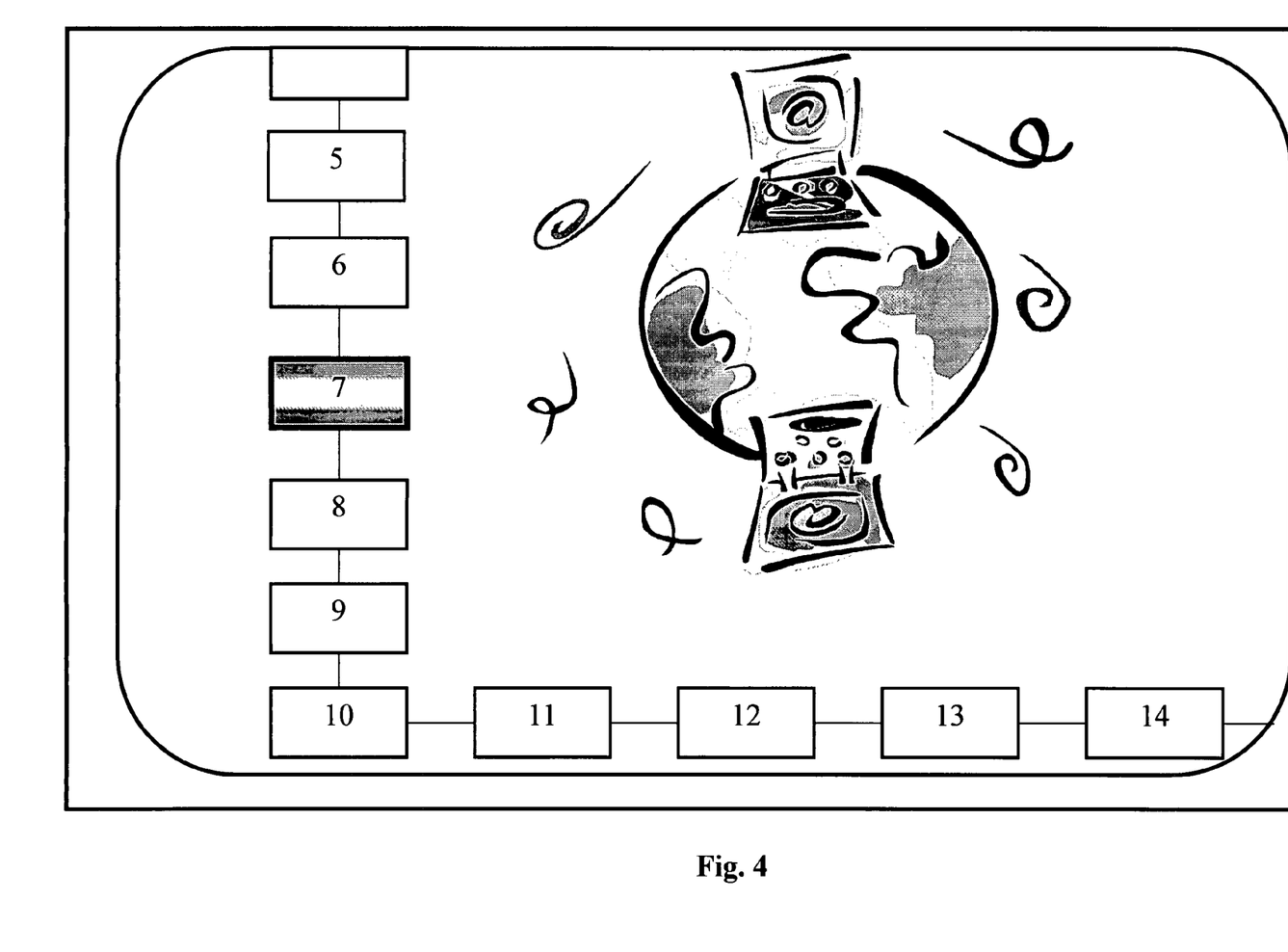

Depicted in FIG. 4 is a screen background image and a set of graphical identifiers of groups. A graphical identifier of a group is an icon containing a number varying from 1 to the number of groups calculated during the step of determining groups. These identifiers are joined by a graphical link giving the user an indication of the navigation command to be activated to change groups. In the example illustrated in FIG. 3, group 7 is selected, by pressing the ↑ direction key, group 6 is selected, and by pressing the ↓ direction key, group 8 is selected. The icon containing the current group (group 7 in FIG. 4) is emphasized by a bolder contour, or by highlighting, or by a flashing or else a coloured background. If the icons are disposed horizontally, the user uses the → and ← direction keys to change groups.

When the user navigates groupwise, the apparatus reproduces the sound document representing the group. In this way, the user can in an auditory manner ascertain the genre of sound or of music which is common to the set of documents of the group. A variant consists in the fact that a determined number of sound documents represent the group. According to this variant, these documents are reproduced loopwise when the group is selected. The representative documents are for example those situated at a distance less than a determined value from the equibarycentre. An improvement of this variant consists in the fact that the user himself determines the number of each group's representative documents. In this way, the user may instigate the reproduction of a significant number of documents having auditory continuity without selecting them manually. The first document selected by the program as representative is that of the group whose distance is smallest from the equibarycentre, then the second, then the third and so on and so forth. When the number programmed by the user is reached, the program selects the first document.

Another improvement consists in reproducing only an extract of each document. The duration of each extract may be defined by the program, or advantageously, the user programs this duration. In this way, the user can rapidly get an idea of the genre of sound documents located in the group.

When a group is selected, the user presses the "sound documents" key to select each document of the group and thus activate its sound reproduction. He can then go from one document to another by virtue of the → and ← direction keys. If the graphical interface so permits, the title of the sound document is displayed. Advantageously, the titles of the two documents situated immediately before (selectable by the ← key) and after (selectable by the → key) are also displayed. The user can thus ascertain the two documents directly reproducible on the basis of the current document.

In the foregoing, an embodiment applied to an apparatus having a means of display (2) was described. This means making it possible to graphically reproduce the identifier of the document representing a group of documents having sound similitude. According to another embodiment, the apparatus does not have a refined display means, allowing him to display at least the group identifiers.

Figure 5:
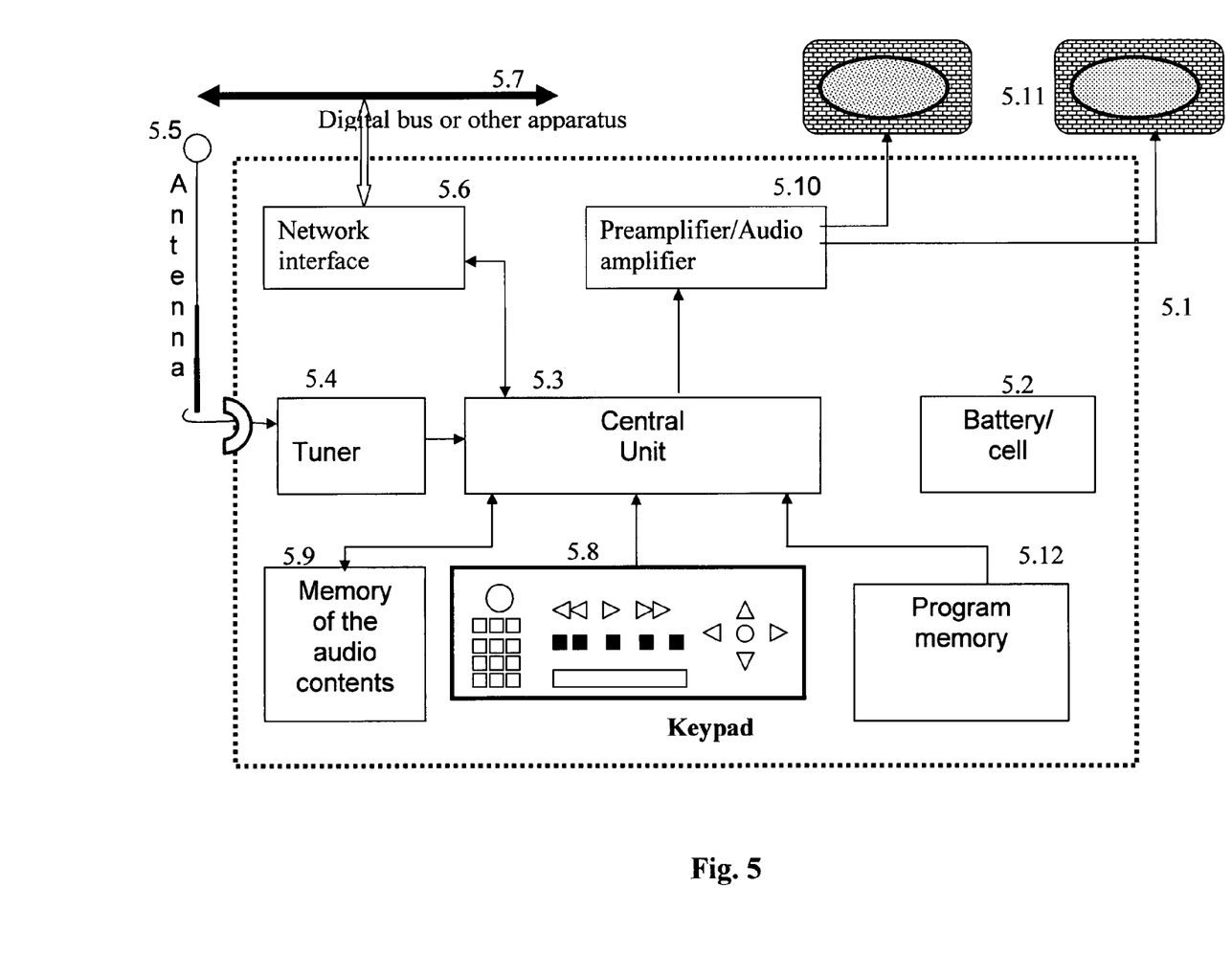
FIG. 5 is a block diagram of an exemplary sound document reproduction apparatus according to a second exemplary embodiment, FIG. 6 describes a representation of the sound space in which the user moves around according to a second exemplary embodiment of the invention, FIG. 7 describes a block diagram of the audio interface according to a second exemplary embodiment of the invention.

Such an apparatus is described by FIG. 5, and the manner of operation of a player for reproducing audio documents 5.1 will firstly be described. This player is portable and stand-alone, it has a battery 5.2, a Central Unit 5.3 (UC) linked to a program memory 5.12, and has a keypad 5.8 allowing the user to introduce all the commands required for the reproduction of the audio contents, an audio interface 5.10 comprising at least one D/A converter, at least one preamplifier whose gain is adjustable by the UC 5.3 and an amplifier dispatching the amplified sound signals to at least two loudspeakers 5.11. The keypad 5.8 has four direction keys and a rotary element making it possible to introduce a leftward or rightward rotational motion, conventional commands for reproducing a sound document (play, fast forward, fast rewind, stop, volume adjustment), a rotary selector and at least one thumbwheel. The loudspeakers 5.11 are connected to the player, they may be earphones on a headset worn by the user. The audio contents are advantageously recorded in a hard disk 5.9, but any other recording medium may suit, in particular removable media (audio CD, DVD, magnetic cartridge, electronic card, etc). The audio contents may be downloaded into the hard disk 5.9 in the same way as that described for FIG. 1. The downloading of an audio content is a well-known technique that it is unnecessary to explain in the present document.

Once a certain number of audio contents have been stored in the memory 5.9, the user wishes to select them and reproduce them. To do this, the program analyses each audio content and extracts therefrom the low-level parameters. The signal analysis techniques are identical to those indicated previously for the apparatus described by FIG. 1.

Figure 6:
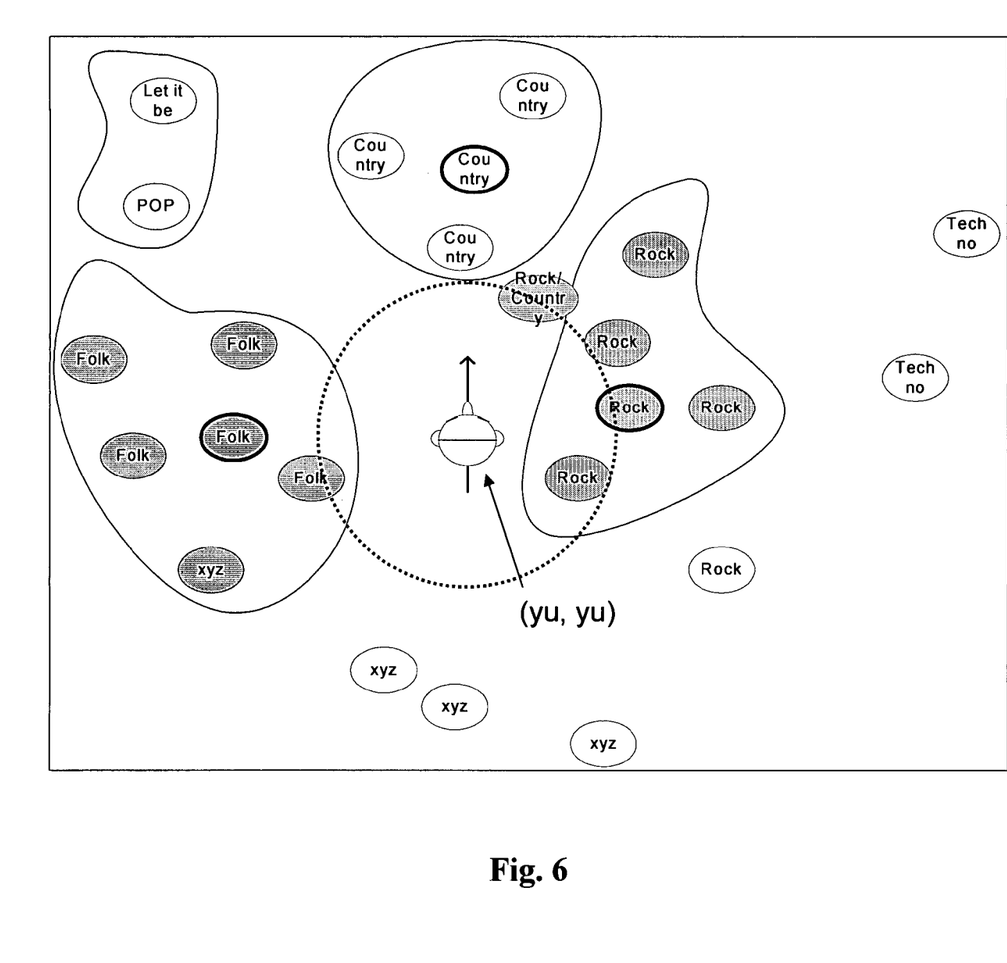

According to an example of this second embodiment of the invention, the sound documents Di accessible from the player are virtually represented by points Pi disposed in a sound space with n dimensions. For the sake of simplicity and comprehension, this second exemplary embodiment uses a IS sound space with two dimensions. The layout of FIG. 6 illustrates such an arrangement. The positions of the points Pi, defined by their coordinates (xi, yi) within the sound space, are calculated on the basis of the low-level parameters. According to the example of FIG. 3, a point Pi is an identifier representing a sound document Si. The coordinates (xi, yi) are obtained by projecting the point Pi whose coordinates are the values of the low-level descriptors onto a sound sample, onto a space of dimension 2, 3, etc., depending on the type of representation chosen. The projection from the space of descriptors to this two-dimensional space is determined through principal component analysis or PCA. PCA is described in particular in the Saporta document 1990, entitled "Probabilites Analyse de donnees et statistiques, Edition Technip" [Probabilities data analysis and statistics, published by Technip]. This data analysis algorithm is aimed at determining a subsystem of axes that is linearly tied to the original which best "spreads" the documents, the axes tend to merge the correlated original axes. In this way, the program can analyse the sound documents and itself determines principal dimensions. Then, it is the program which chooses the number of dimensions of the sound space. According to this technique, the document collection can be represented by a space with more than two dimensions. It is thus possible to create a sound space with three dimensions in which the user moves around. In this case, the installation must be equipped with additional loudspeakers 5.11, and they must be arranged high up and low down so as to give the user the impression that the sound is also coming from high up or from low down. The low-level descriptors being assumed to have a perceptible coherence and the projection being continuous, the close points correspond to perceptually close sounds. In a general manner, the coordinates $\{x_i, y_2, \ldots zi\}$ of a point Pi in a multidimensional space allow the user to determine the type of associated sound document. Specifically, the positions of the points Pi being calculated as a function of the values of low-level parameters, if two points are graphically distant, the values of the low-level parameters of the two sound documents identified by these two points are very different and hence, the type of the sound content is different, for example a piece of classical music and a political speech. On the other hand, if two points are close, then so also are the types of the associated sound documents from the auditory standpoint.

The user selects a document within the sound space through the auditory perception that the player generates. To do this, the player positions the user at the centre of the sound space, at a point Pu with coordinates (xu, yu), and selects the audio documents whose points Pi are nearest the position (xu, yu) with a view to reproducing them. Through its auditory perception, the user is aware of the sound space, and can orient himself towards a document Di with the aid of the sound "emitted" by the point Pi associated with this document, by actuating the key which gives the direction of the loudspeaker 11 reproducing this document with the loudest intensity.

Figure 7:
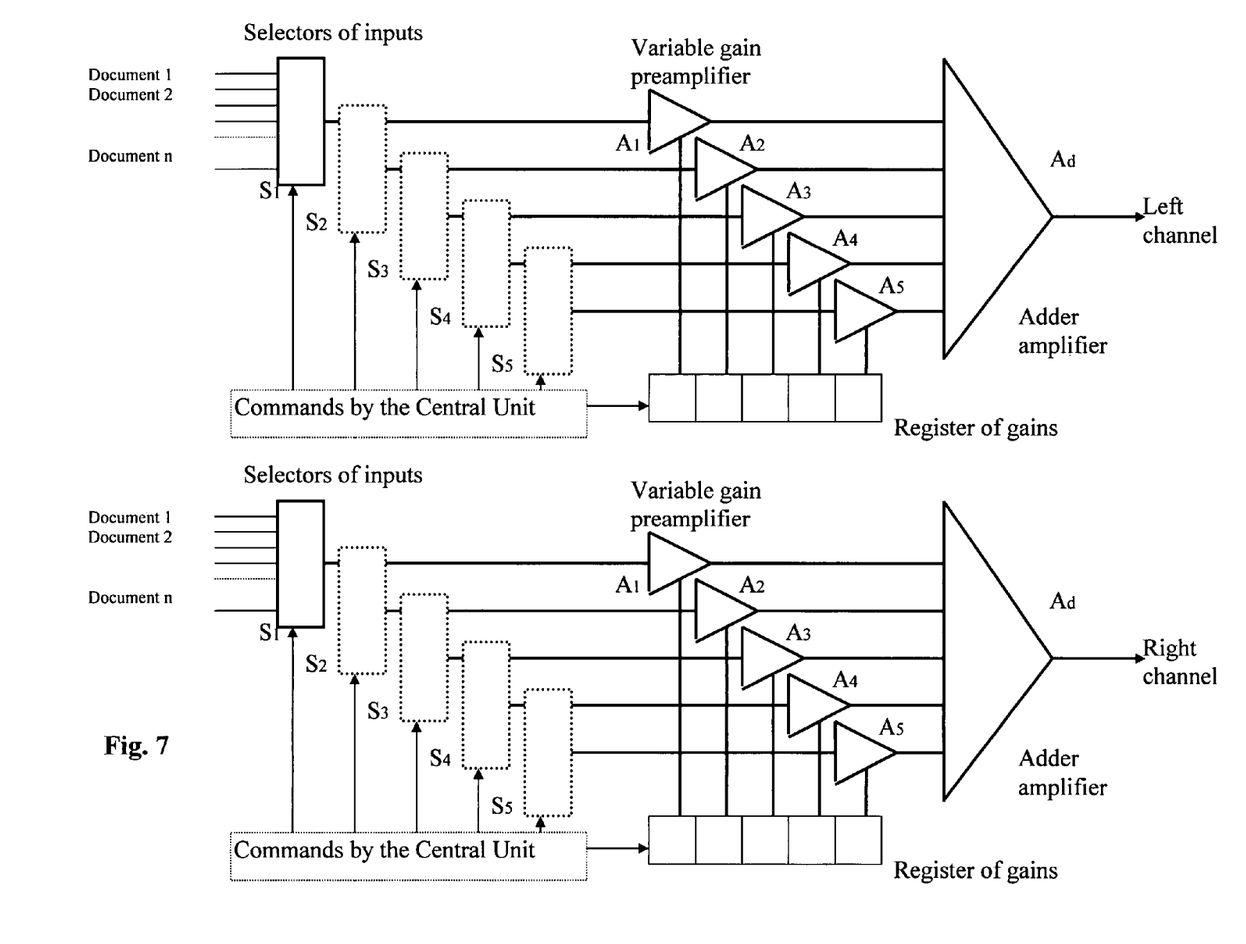

The layout of FIG. 7 illustrates the details of the audio interface 5.10. The audio interface 5.10 is composed of two identical parts, one for reproduction on the left earphone 5.11 and the other for the right earphone 5.11. The number of documents selected by the program must be small, five for example. For each channel, the UC 5.3 associated with its program recorded in the memory 5.12 controls five selectors S1, S2, S3, S4 and S5 whose functions are to select a document from the set of audio documents of the memory 5.9 and to reproduce it. The five audio signals selected by the selectors Si are transmitted respectively to five preamplifiers A1, A2, A3, A4 and A5 whose gains are controlled by the UC 5.3. The gain of a preamplifier Ai reproducing an audio document Di is proportional to the distance between the sound space separating the point (xu, yu) and the point Pi, with coordinates (xi, yi) associated with this document. The gain also depends on the direction in which the point (xi, yi) is situated with respect to a straight line starting from the point (xu, yu) in the direction ahead of the user placed in the sound space. This straight line is represented by an arrow in FIG. 6. So that, all the documents whose points Di are situated to the left of the user in the sound space are reproduced by the left channel, and those situated to the right are reproduced by the right channel. Moreover, the gain is all the larger as the angle between the segment formed of the points Pi and Pu, and the straight line Du representing the direction ahead of the user decreases. If the document is dead ahead of the user, the point Pi is therefore on this straight line Du so the user hears the audio content of this point equally well to the left and to the right. Finally, the five signals emitted by the preamplifiers are mixed in an adder amplifier and amplified before being dispatched to the earphones or loudspeakers 5.11.

Thus, the user hears different audio contents to the left and to the right of his ears. As a function of the sound signals, he can steer to the left or to the right with the aid of the direction keys placed on the keypad 5.8, and orient himself towards a point corresponding to a content Di which he wishes to listen to. When the point (xu, yu) is situated at the same location as the point (xi, yi) corresponding to the sound document Di, or is close to it by at most a determined distance, the document is regarded as selected and reproduced in stereo on the two earphones 5.11, the other four documents are no longer reproduced. If the user presses the direction keys and moves away from the document that he has just listened to, the program then reproduces the five documents closest to the point (xu, yu) with the weightings corresponding to distance and to direction.

A variant consists in implementing a "Select" key on the keypad 5.8 of the player 5.1. When the user presses this key, the program selects the sound document closest to the point (xu, yu) where the user is virtually located and instructs reproduction thereof to the exclusion of any other document. The position (xu, yu) is stored in memory so that a second press of the "Select" key causes a return to the previous state when the five sound documents closest to the position of the point (xu, yu) are reproduced.

We shall now describe improvements which will aid the user to navigate within the sound space.

The five documents closest to the point associated with the user are also close auditorily speaking, so that it is not easy for the user to determine an axis of movement as a function of a particular type of music for example. A first improvement consists in determining groups of sound documents having auditory coherence, and in reproducing one or more so-called "representative" documents of each group. The determination of the groups may be performed as was described previously, for example by comparing the values contained in the descriptors of the sound documents, whether they be downloaded or calculated locally, and by grouping those whose values are close.

In a manner that is particularly simple to calculate, the representative of a group is the audio document whose point is situated closest to the centre of the nebula of points of each audio document of the group. Its identifier is the audio content. According to a variant, the representative is a succession of documents or of extracts of the documents of the group, the identifier is then a sound content constituted by the successive reproduction of extracts of each document representing the group, each extract being reproduced for 10 seconds for example. The extracts are reproduced loopwise. According to another variant, the program produces a synthetic sound calculated on the basis of an average of the low-level parameters characteristic of the sound documents of the group.

The assignment of a document to a determined group is performed by adding a new column to the array of descriptors of FIG. 2, this new column contains the number identifying the group to which the document belongs. In FIG. 6, four groups have been identified by contours. When the user wishes to navigate around groups, he presses a key, called "Group", of the player and according to the example illustrated by this figure, the four documents most representative of each group are reproduced (these four documents appear in FIG. 6 with a bold contour). This mode of navigation is deactivated by pressing the "Group" key again. By firstly navigating from one group to another, the user rapidly selects the type of audio content that he wants, then by deactivating the mode, he navigates from close document to close document within this group. By actuating the rotary element disposed on the keypad 5.8, the user remains on the same point Pu of the sound space and changes the direction indicated by the arrow in FIG. 6. Thus, while remaining on the spot the user can search for a direction of movement, halt his rotation when the type of music which perceives ahead of him and then orient himself in this direction.

A variant of the "group" key consists in regarding the speed of movement as a means of selection of the mode of navigation and of the way of calculating the groups. The user moves by pressing the four direction keys, when he presses a key for a long time or successively and rapidly, the program considers that the user wants to increase the speed of movement. A single and short press on a key makes it possible to return to a normal speed of movement. A variant consists in implementing a thumbwheel on the keypad 5.8 enabling the user to determine the speed finely. In case of rapid movement, the program creates few groups of large size. These groups containing numerous songs, the representatives that the user will hear will necessarily give only an approximate idea of the content of the groups. If the user slows down his speed of movement, the program will create smaller groups and hence permit the user finer selection. In this case, it is unnecessary to calculate groups for the whole set of songs but only within the neighbourhood of the user. These groups being defined more finely, the representatives are more faithful to the content of the groups. When the speed is a minimum, only the closest documents are reproduced and thus the mode of navigation from close documents to close documents is regained.

Although the present invention has been described with reference to the particular embodiments illustrated, it is in no way limited by these embodiments, but is so only by the appended claims. It should be noted that changes or modifications may be made by the person skilled in the art.

The invention claimed is:

1. Method of reproduction within an audio documents reproduction apparatus wherein it comprises the following steps:
   partitioning of the documents into groups of documents possessing at least one similar audio characteristic,
   determination of at least one number of the group's representative documents, determination of a determined number of audio documents representing each group, positioning of a plurality of audio documents in a space, the positioning of an audio document being dependent on at least one characteristic of the document, the user occupying a position in the said space, reproduction of the identifiers of the several documents representing a group, the reproduced identifiers having a position situated at a distance less than a determined distance with respect to the position of the user in the space, the identifiers being reproduced loopwise when this group is selected.

2. Method of reproduction according to claim 1; wherein the method comprises introducing commands for navigating group wise, each command activating the reproduction of at least one identifier representing the graphically emphasized group.

3. Method of reproduction according to claim 1; wherein the method comprises a step of introducing a command activating the reproduction of audio documents within the group whose identifier is reproduced, the reproduction of audio documents being performed in a predetermined order.

4. Method of reproduction according to claim 3; wherein the predetermined order of reproduction of the documents of a group consists in commencing with that whose point is the closest to the barycentre, and thereafter in taking those situated further and further away.

5. Method of reproduction according to claim 1; wherein the determination comprises a representation of the documents in a space whose number of dimensions is equal to the number of audio parameters, and whose documents are associated with points disposed within this space, the determination of a document of the group as representative of this group depending on the distance between the points associated with the documents of the group and the point associated with this document.

6. Method of reproduction according to claim 5; wherein the representation comprises a projection onto a space of determined dimension of the points associated with the documents of the set and possessing as coordinates the audio parameters, the calculation of distance between the equibarycentre of the group and the point associated with this document being performed in the projection space.

7. The method of reproduction according to claim 5; wherein the reproduction of the identifiers commences with that whose point is closest to the barycentre of the points associated with the documents of the group, and thereafter those situated further and further away from the barycentre.

8. Method of reproduction according to claim 1; wherein all documents representing a group are associated with points whose distances from the equibarycentre of the points of the documents of the group are situated at a distance less than a determined value from the eguibarycentre of the points of the documents of the group, the number of the group's representative documents being variable according to each group.

9. Method of reproduction according to claim 1; wherein a representative document of a group possesses low-level parameters whose values are close to the average of the values of the documents of the group.

10. Method of reproduction according to claim 1; wherein the reproduction of each of the documents representative of this group is performed sequentially during a determined period.

11. The method of reproduction according to claim 10; wherein the method comprises an introducing step of the determined period.

12. Method of reproduction according to claim 1; wherein the method comprises an introducing step of the number of the group's representative documents.

13. Audio documents reproduction apparatus comprising a means of command introduction; wherein the apparatus comprises a means of determination of at least one number of the group's representative documents, a means of calculation for partitioning documents into groups of documents possessing at least one similar audio characteristic, a means of determination of a determined number of documents representing each group, a means of calculation of positioning data associated with each document in a space, the data being determined by at least one characteristic specific to the document, a positioning datum also being assigned to the position of the user within the space, a means of selection of each document representing a group, the selected documents having a position situated at a distance less than a determined distance with respect to the position of the user in the space, a means of reproduction reproducing the identifiers of the several documents representing a group loopwise when the group is selected.

14. Audio documents reproduction apparatus according to claim 13; wherein the apparatus furthermore comprises a groupwise navigation commands introduction means, each command activating the reproduction of at least one identifier representing the graphically emphasized group.

15. Audio documents reproduction apparatus according to claim 13; wherein the apparatus comprises a means of introduction of a command activating the means of reproduction of audio documents within the group whose identifier is reproduced, the reproduction of audio documents being performed in a predetermined order.

16. Audio documents reproduction apparatus according to claim 15; wherein the means of determination of a determined number of document representing a group chooses those whose point is situated at a distance less than a determined value from the equibarycentre of the points of the documents of the group, the number of the group's representative documents being variable according to each group.

17. Audio documents reproduction apparatus according to claim 15; wherein the means of reproduction reproduces the documents commencing with that whose point is closest to the barycentre of the points associated with the documents of the group, and thereafter those situated further and further away from the barycentre.

18. Audio documents reproduction apparatus according claim 13; wherein the apparatus comprises a means of representation of the documents in a space whose number of dimensions is equal to the number of audio parameters, and whose documents are associated with points disposed within this space, the means of determination of at least one document representing a group takes into account the distance between the equibarycentre of the points associated with the documents of the group and the point associated with this document.

19. An audio documents reproduction apparatus according to claim 18; wherein the means of reproducing commences the reproducing of the identifiers with that whose point is closest to the barycentre of the points associated with the documents of the group, and thereafter those situated further and further away from the barycentre.

20. Audio documents reproduction apparatus according to claim 13; wherein the means of determination of each document representing a group chooses those whose values of the audio characteristics are close to the average of the values of the documents of the group.

21. Audio documents reproduction apparatus according to claim 13; wherein the means of reproduction sequentially reproduces each documents chosen during a determined period.

22. An audio documents reproduction apparatus according to claim 21; wherein the apparatus comprises a means of introducing of the determined period.

23. An audio documents reproduction apparatus according to claim 13; wherein the apparatus comprises a means of introducing of the number of the group's representative documents.

* * * * *